[19] United States Patent
Rafaniello et al.

[11] Patent Number: 4,804,525
[45] Date of Patent: Feb. 14, 1989

[54] PRODUCING BORON CARBIDE

[75] Inventors: William Rafaniello; William G. Moore, both of Midland, Mich.

[73] Assignee: The Dow Chemical Company, Midland, Mich.

[21] Appl. No.: 73,035

[22] Filed: Jul. 14, 1987

Related U.S. Application Data

[63] Continuation-in-part of Ser. No. 851,858, Apr. 14, 1986, abandoned.

[51] Int. Cl.$^4$ .............................................. C01B 51/56
[52] U.S. Cl. .................................... 423/291; 423/289; 423/439
[58] Field of Search ........................ 423/291, 289, 439

[56] References Cited

U.S. PATENT DOCUMENTS 3,379,647  4/1968  Smudski ............................. 423/289
4,017,587  4/1977  Ditter et al. ....................... 423/291

FOREIGN PATENT DOCUMENTS

0175717  10/1982  Japan .................................. 423/291
0030710  2/1984  Japan .................................. 423/291

Primary Examiner—John Doll
Assistant Examiner—LSF Lori S. Freeman

[57] ABSTRACT

A method of producing submicron size boron carbide powder by heating a reactive mixture containing a boric oxide source and a carbon source at a high temperature for a sufficient length of time to form submicron particles of uniform size.

30 Claims, 2 Drawing Sheets

SEM (SCANNING ELECTRON MICROSCOPE) PHOTOMICROGRAPH MAGNIFIED 2000 TIMES OF THE BORON CARBIDE PRODUCT FORMED IN EXAMPLE 1

SEM PHOTOMICROGRAPH MAGNIFIED 2000 TIMES OF THE BORON CARBIDE POWDER FORMED IN EXAMPLE 3

TEM (TRANSMISSION ELECTRON MICROSCOPE) PHOTOMICROGRAPH MAGNIFIED APPROXIMATELY 55,000 TIMES OF THE BORON CARBIDE POWDER FORMED IN EXAMPLE 4

SEM PHOTOMICROGRAPH MAGNIFIED 12,000 TIMES OF THE BORON CARBIDE POWDER FORMED IN EXAMPLE 5

PRODUCING BORON CARBIDE

CROSS-REFERENCE TO RELATED APPLICATION

This is a continuation-in-part of application Ser. No. 851,858 filed Apr. 14, 1986.

BACKGROUND OF THE INVENTION

This invention relates to a method of producing boron carbide and more particularly to a method of producing boron carbide of submicron size.

Boron carbide ($B_4C$) is a ceramic material which is used in application requiring great hardness. For example, boron carbide is used in armor plating applications and for producing sand blasting nozzles, bearings and dies. For some applications, it is important and desirable to use high purity, monodispersed boron carbide powder having a size of less than one micron because such powders, for example when subjected to a hot-pressing process for forming ceramic products, yield a higher quality ceramic part.

There are a number of methods in the art for producing a boron carbide powder. For example, U.S. Pat. No. 2,834,651 discloses a method of producing fine boron carbide of fine particle size by heating a mixture of boron oxide, carbon and magnesium. The boron carbide produced by the method described in U.S. Pat. No. 2,834,651 is unsatisfactory for high purity applications because the boron carbide is contaminated with the magnesium starting material and even after repeated digestions with hot mineral acids, the magnesium is difficult to remove.

Very fine powders of boron carbide have been produced by vapor phase reactions of boron compounds with carbon or hydrocarbons, using laser or plasma energy sources. These reactions tend to form highly reactive amorphous powders. Due to their extreme reactivity, handling in inert atmospheres may be required to avoid excessive oxygen and nitrogen contamination. These very fine powders have extremely low bulk densities which make loading hot press dies and processing greenware very difficult.

It is desired to prepare a boron carbide powder as a single phase equiaxed crystalline product with a narrow particle size distribution so as to have optimum reactivity. Said product could be hot pressed into a pore free, uniform fine grained $B_4C$ ceramic product without excess carbon or low melting metallic carbide impurities which are deleterious to physical properties of the final ceramic product.

Another method known in the art for producing a boron carbide powder is described in U.S. Pat. No. 3,379,647. That method involves a carbothermic reduction of boron oxide. According to said method, a reactive mixture comprising a carbon source, such as finely divided carbon, and a boron oxide source, such as a boron oxide, is prepared and then fired at a relatively high temperature, whereby the boron oxide which is present initially or which is formed thereupon is reduced, the corresponding boron carbide being concurrently produced. This reaction ordinarily proceeds according to the general equation:

$$2 B_2O_3 + 7C \rightarrow B_4C + 6 CO$$

Generally, the temperature of firing the reactive mixture above is in the range of 1700°–2100° C. The reaction is generally carried out in a protective, non-intering atmosphere such as an inert gas or a vacuum. A major shortcoming of the method of U.S. Pat. No. 3,379,647 is that substantially all of the product is not below one micron and a uniform size distribution is not obtained. In the aforementioned process, the particle size of boron carbide can range anywhere from 0.5 to 150 microns with no control of particle size distribution.

It is desired to provide a novel method of producing a submicron size boron carbide powder by the carbothermic reduction of an oxide of boron. It is further desired to obtain a boron carbide product wherein substantially all of the particles of boron carbide are less than 1 micron and wherein at least about 95 percent by count of the particles are less than 1 micron.

SUMMARY OF THE INVENTION

The invention is a method of producing boron carbide powder of submicron size by passing a particulate reactive mixture of a boric oxide source and a carbon source through a hot zone such that substantially all of the particles are separately and individually heated at a sufficient temperature and for a sufficient length of time to form boron carbide crystals of submicron size.

DETAILED DESCRIPTION OF THE PREFERRED EMBODIMENTS

In accordance with one embodiment of the present invention a reactive mixture of a boric oxide source and a carbon source is heated at a sufficiently high temperature and at a sufficiently rapid rate to form a boron carbide powder having a submicron particle size. A narrow particle size distribution of boron carbide is obtained with the method of the present invention.

The boric oxide source useful in the present invention may be boric oxide itself or any boron-containing material which upon heating will form boric oxide. Preferably, the boric oxide source used in the present invention is boron oxide ($B_2O_3$) or boric acid ($H_3BO_3$) which upon heating forms $B_2O_3$. The boric oxide source includes any intermediates formed during thermal decomposition of boric acid to $B_2O_3$ such as $HBO_2$. Mixtures of boric oxide sources can be employed.

The carbon source useful in the present invention may be any carbon-containing material which upon heating will form carbon. Preferably, the carbon source used in the present invention is of high purity with a low content of heavy metals. The heavy metals include, for example, iron (Fe), chromium (Cr), and nickel (Ni). Preferably, the purity of the carbon used in the present invention should be such that the final boron carbide product contains less than 500 ppm of Fe and preferably less than about 200 ppm of Fe.

Commercial carbon sources which are produced from thermal decomposition of hydrocarbons to yield carbon particles having specific surface area values ranging from about 7 square meters per gram (m²/g) to about 2000 m²/g have been used successfully. Reactive carbons of high purity are made from cornstarch by controlled decomposition or from the thermal decomposition of a predominantly vinylidene chloride polymer such as Saran ® and have a surface area of about 700 m²/g or about 1400 m²/g, respectively. Preferably, the carbon source used in the present invention is a relatively inexpensive and readily available carbon source such as starch. Other carbon sources include, for example, acetylene carbon black, carbon black sold under the trade name Vulcan XC-72 by Cabot Corporation, carbon black sold under the trade name Cancarb N991-UP by International Minerals Company, Saran ® carbon and mixtures thereof.

As stated hereinabove, it is not desirable to have magnesium present in the reaction due to the difficulty involved in removing magnesium from the product. Therefore, it is preferred that the starting materials preferably is conducted in the substantial absence of magnesium metal.

In carrying out one method of the present invention, a reactive mixture of a boric oxide source such as $B_2O_3$ and a carbon source such as carbon black, is prepared by mechanically mixing together the boric oxide source and carbon source in amounts sufficient to form theoretical $B_4C$. The reactive mixture, herein referred to as the boron carbide precursor, is then heated at a reaction temperature for a sufficient length of time in accordance with the present invention to form $B_4C$. The reaction carried out upon heating of the starting materials may be represented by the following empirical formula:

$$2 B_2O_3 + 7 C \rightarrow B_4C + 6 CO$$

Preferably, in carrying out the above reaction, substantially complete reaction of the carbon is desired to eliminate any "free carbon" in the boron carbide product. It has been found that the presence of free carbon in a ceramic body produced from the boron carbide product, for example, by a hot pressing process, can be very detrimental to the physical properties of the ceramic body such as hardness and fracture toughness.

In carrying out the method of the present invention, complete reaction of the carbon is difficult because the reaction by-product, carbon monoxide, carries volatile boric oxide species away from the reaction site. It has been found that when stoichiometric quantities of $B_2O_3$ are used, free carbon contaminates the final $B_4C$ powder product. It is, therefore, advantageous to use an excess amount of $B_2O_3$ in the reaction to minimize the amount (<1 percent) of free carbon present in the product. After the reaction is carried out, any residual $B_2O_3$ may be recycled to produce more $B_4C$. Preferably, an excess of from about 0 to about 50 percent $B_2O_3$ is used in the reaction and more preferably, an excess of from about 5 to about 30 precent $B_2O_3$ may be used.

In carrying out another method of the present invention a particulate boron carbide precursor is prepared and thereafter heated at the reaction temperature for a sufficient length of time necessary to form the $B_4C$ in accordance with the present invention. The particulate boron carbide precursor consists of a reactive mass containing boric oxide, or a compound which will form boric oxide upon heating, and carbon, or a carbon-containing compound which will form carbon upon heating. The boron carbide precursor may be prepared by various methods known in the art, for example, as described in U.S. Pat. Nos. 3,379,647 and 3,885,022, the teachings of which are incorporated herein by reference with respect to boron carbide precursor preparation. Preferably, the particulate boron carbide precursor is formed by contacting a boric oxide-forming material and a carbon source in an aqueous solution and intimately mixing the components. Then, the aqueous mixture is heated sufficiently to remove substantially all of the water in the mixture and thermally decompose the mixture to a solid reactive mass containing intimately mixed boric oxide and carbon. The aqueous mixture is heated at temperatures in the range of about 180° C. to about 1300° C., preferably in the range of about 300° C. to about 800° C. to form the solid reactive mass.

Having formed the particulate boron carbide precursor, the precursor is heated in a hot zone to cause the reaction of $B_2O_3$ with carbon to form $B_4C$. The reaction is carried out at a reaction temperature in the range of about 1550° C. to about 2000° C., preferably at a temperature of about 1600° C. to about 1900° C. Temperatures lower than 1550° C. may result in the production of larger than submicron crystals of boron carbide or low yields of submicron cyrstals. The reaction temperature at the high end of the temperature range is limited only by the $B_4C$ product fusing or sintering together.

The heating method of the present invention is an important feature of the invention. The undivided particles of the reactive mixture of boric oxide and carbon, from the outer surface of the particle to its innermost portion, must be individually and separately brought up to the reaction temperature in a short period of time, i.e. in a matter of seconds, to produce submicron size boron carbide. The intimate mixture of boron oxide and carbon is preferably rapidly heated to a reaction temperature which is hundreds of degrees centigrade higher than the reaction initiation temperature of approximately 1350° C. The mixture is maintained at the reaction temperature for a sufficient length of time to substantially complete the reaction to form submicron boron carbide. In addition, the particle size of the feed material must be small enough to allow the particle interior to also follow the rapid heating rate necessary for producing submicron crystals.

Prior to heating the precursor material to the reaction temperature, the precursor material is preferably ground to a particle size of less than 2000 microns, more preferably, less than 50 microns. Heat transfer to the interior of large, i.e. 20 mm, particles or large close packed agglomerates of finer particles will not occur at a sufficiently high rate that will form exclusively submicron particles. For example, a 3 inch diameter by 10 inch long cylinder of boric oxide-carbon mixture can be heated in a furnace controlled at 1750° C. for one hour and fifty minutes, cooled to room temperature and examined for conversion to boron carbide. The outer 1 inch of the cylinder is reacted to form boron carbide crystals with a mixture of large, i.e. 1–20 micron, crystals whereas about 1 inch in diameter of the inner core of the cylinder remains unreacted; that is, the maximum temperature of said inner core was less than 1350° C. It is found that the resistance to heat transfer for the large mass limits the heating rate in the interior such that the predominant crystal size is 10–20 microns.

The same boric oxide-carbon mixture feed material may be ground to 1–2 mm and fed continuously into a 1700° C. crucible at a rate which allows the individual particles to be heated to the surrounding temperature in several seconds with the result that no large crystals are formed and the product is entirely submicron boron carbide. For production of uniform narrow particle size distributions, a steady feed rate of well dispersed feed particles in a hot zone is preferred.

The heating apparatus used in the present invention may be any type of heater known in the art for heating particles to the reaction temperatures and at the heating rates in accordance with the invention. For example, a tubular-type reactor such as disclosed in U.S. Pat. No. 4,056,602 may be used in the present invention. In the tubular type reactor, the material is fed into the reactor, for example, using a screw feeder and the like, and is allowed to fall to the hot zone of the reactor by gravity and pass through the hot zone to a collection point. The particles are heated at a rapid rate and form $B_4C$ particles substantially immediately upon contacting the hot zone. The heating rate employed is at least about 70° C./sec or higher. The rate of heating the reactive mass preferably is in the range of from about 70° C./sec to about 100,000° C./sec, and more preferably is from about 200° C./sec to about 10,000° C./sec.

For vertical tubular flow through reactors, the feed size and particle dispersion is somewhat more critical because of the limited time available for heating the falling particles. It has been found that large, i.e. 1-2 mm, feed particles will not be heated to a reaction temperature of 2000° C. in the time it takes to fall through a 6 inch diameter by 6 feet high vertical tubular reactor. Particles about 200 microns will heat up and partially react while particles less than 50 microns can be heated and completely reacted in less than two seconds. The particle size and feed rate must be matched to the heat transfer limitations of the reactor system to allow each particle to be heated to the reaction temperature in several seconds where the temperature is maintained at greater than 1550° C.

Those familiar with the art will recognize that fine powders such as the 50 microns intimate mixture of boric oxide-carbon tend to agglomerate to much larger sized aggregates which can negate the rapid heating rate necessary for producing submicron $B_4C$. For discharge agglomerates initially of a size related to the lead of the screw and at an intermittent rate coincident with the rotation rate of the screw. Dispersion of these agglomerates in a carrier gas before entering the furnace will aid in obtaining the uniform high heating rate essential for a narrow particle size distribution of submicron $B_4C$ cyrstals.

The dispersed feed particles can reagglomerate after entering the reactor if temperature zones are encountered which are above the melting point of the boron oxide (approximately 300° C. to 500° C.) but below the 1350° C. to 1400° C. reaction initiation temperature.

A preferred embodiment of the present invention is preparing an intimate boric oxide-carbon reactive mix of a particle size which can be rapidly heated to the reaction temperature in a matter of seconds, metering said feed mix at a uniform rate to a flowing inert gas stream where deagglomeration by mechanical or pneumatic means occurs such that the particles are dispersed, flowing the dispersed feed particles through a cooled pipe maintained below the melting point of the boron oxide phase and then passing the feed particles into a reaction zone, which is at a temperature substantially above the incipient reaction temperature of boron oxide-carbon, to rapidly heat the particles to the reaction temperature at a rate which produces submicron boron carbide crystals.

The boron carbide produced by the method of the present invention is a fine powder of submicron size. The size of the majority of boron carbide particles is less than about 1 micron. Preferably, all of the particles are less than about 1 micron in size. More preferably, the particles are from about 0.05 micron to about 0.45 micron in size. The submicron particles preferably are monodispersed, non-agglomerated and equiaxed particles, such as those shown in FIG. 2. One advantage of obtaining the submicron particles of the present invention is that no further grinding is necessary before the particles are used in a process for forming a ceramic body. For example, after washing the boron carbide particles to remove excess $B_2O_3$, the $B_4C$ particles can be used directly in forming ceramic products by hot pressing or pressureless sintering.

Another advantage of the method of the present invention is that the particle size distribution of the boron carbide produced is narrower than other methods in the art. For example, about 95 percent by count of the particles will be one micron or less and about 75 percent by count may be 0.5 microns or less. On a weight percent basis, the boron carbide product typically has at least about 25 percent submicron particles, preferably at least about 50 percent, more preferably at least about 65 percent, still more preferably at least about 80 percent, even more preferably at least about 90 percent, and most preferably at least about 95 percent submicron particles. It is preferred that the maximum particle size is less than about 8 microns, and more preferably less than about 3 microns.

Substantially all of the boron carbide produced by the method of the present invention contains a boron to carbon (B:C) ratio near the theoretical formula $B_4C$ and the boron carbide is substantially free of excess carbon. The boron carbide powder produced by the method of the present invention may be used for example, in making armor plates, nuclear reactor rods, and sand blasting nozzles by techniques well-known in the art such as hot pressing and pressureless sintering.

The following examples are illustrative of the present invention and are not for the purpose of limiting the invention. Unless otherwise stated, all parts and percentages are by weight.

EXAMPLE 1

Boron Carbide Precursor

A boric acid solution was prepared by adding 27 lb of boric acid ($H_3BO_3$) to 62.5 lb of water under constant stirring in a stainless steel vessel. In a separate container, 19 lb of corn starch was dispersed in 62.5 lb of water. The starch-water mixture was added to the boric acid solution while heating the resultant slurry. When the resultant slurry reached a temperature of 80° C., the slurry was pumped into Teflon ®-lined stainless steel trays. The thickness of slurry layered in the trays was about 1 inch thick or less. The trays were placed in a drying oven and allowed to dry at 120° C. for 24 hours wherein a dried flake was formed. The dried flake was removed from the trays by scraping and calcined in a box furnace at 925° C. for 4.5 hours in a nitrogen atmosphere. The calcined material consisted of a reactive mass of boric oxide and carbon. The calcined material was crushed and screened −12 mesh +45 mesh which formed the feed to the reactor.

B₄C Powder Product

A graphite resistance furnace equipped with a water cooled copper feed tube was used in this example. The feed tube was positioned 5 inches above a 7 inch diameter by 7 inch high graphite crucible. The entire system was evacuated and back filled with argon to obtain a nitrogen and oxygen-free inert atmosphere. The furnace temperature was increased to the control point of 1685° C. A screw feeder was calibrated to deliver 4.6 grams per minute (g/min) of the −12 mesh +45 mesh boron carbide precursor prepared above. The feeder was then purged with argon and connected to the furnace so that the feeder would drop feed particles down the water cooled tube into a hot graphite crucible. A flowing argon atmosphere was used during the reaction.

Figure 1:
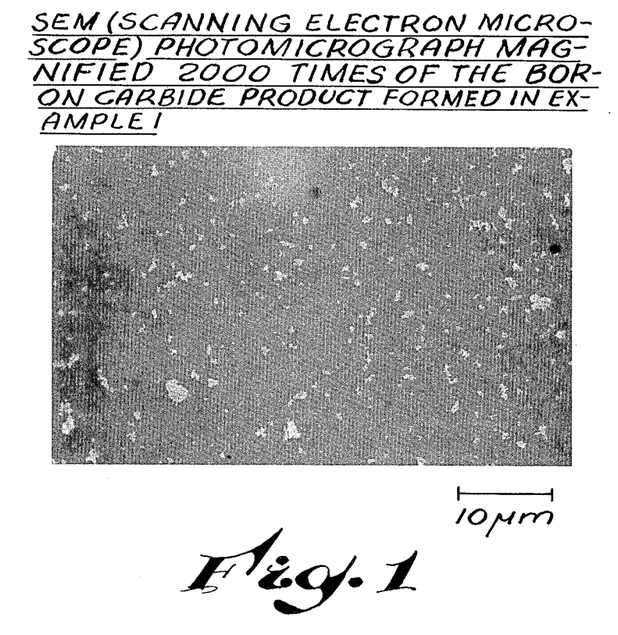
FIG. 1 is an SEM (Scanning Electron Microscope) photomicrograph, magnified 2000 times, of the boron carbide product formed in Example 1.

The graphite crucible was heated in the sealed graphite resistance furnace to 1685° C. An 1100 g sample of the boron carbide precursor was fed into the hot crucible for 4 hours, at a rate of 4.6 g/min. The furnace was then allowed to cool to room temperature (~30° C.) and 176.2 g of boron carbide product was recovered in the crucible. The boron carbide recovered was washed for 24 hours in a mild HCl solution (pH~3) at 80° C. After washing the boron carbide product, 174.5 g of the product remained. The boron carbide product consisted of soft aggregates of equiaxed boron carbide crystals which were 0.35 micron ±0.12 micron in size and which had a boron to carbon ratio of 4.05:1. The boron carbide was produced at a rate of 0.6 lb. B₄C/hr/ft³ reactor volume in a yield of 85 percent. FIG. 1 is representative of the boron carbide powder formed in Example 1 above and shows both soft aggregates and dispersed crystals. The particle size distribution of the product, including the soft aggomerates, is given in Table I.

Comparative Experiment 1—(Not an embodiment of the present invention)

60 g of boric acid, 52.5 g of sucrose and 10 ml of ethylene glycol were blended in a beaker. The uniform mixture was placed in a 175° C. drying oven for 24 hours, and 67.1 g of a dry, black, glassy-looking solid precursor resulted. Then, 20 g of this solid precursor was loaded into a 2.25 inches diameter×4 inches high graphite crucible. The crucible was placed in a furnace and inductively heated to 1900° C. in ~20 minutes and held at that temperature for 30 minutes. Then, the power was shut off and the furnace was allowed to cool to room temperature. An argon atmosphere was maintained in the furnace throughout the operation. The product was boron carbide and the yield was ~3 grams. This experiment employs the method of Example 3 of U.S. Pat. No. 3,379,647. The particle size distribution of the product is given in Table I.

TABLE I

| PARTICLE SIZE DISTRIBUTION | |
|---|---|
| Particle Size (microns) | Weight Percent |
| Example 1 | |
| >10 | Zero |
| 5–10 | 5 |
| 1–5 | 25 |
| 0.5–1 | 25 |
| <0.5 | 45 |
| Comparative Experiment 1 | |

TABLE I-continued

| PARTICLE SIZE DISTRIBUTION | |
|---|---|
| Particle Size (microns) | Weight Percent |
| >20 | Zero |
| 10–20 | 11 |
| 5–10 | 52 |
| 0.5–1 | 1 |
| <0.5 | Zero |

EXAMPLE 2

Boron Carbide Precursor

A boric acid solution was prepared by adding 36.5 lb of technical grade H₃BO₃ to 90 lb of water in a 50 gallon stainless steel reactor vessel, under constant stirring. The temperature of the reactor vessel was maintained at about 60° C. In a separate container, 26.7 lb of corn starch, food grade, was thoroughly dispersed in 90 lb of water. The corn starch-water mixture was added to the boric acid solution while heating and the resultant slurry was heated to 90° C. The slurry was pumped to a drum dryer operating at 131°–139° C. A flake containing about 20 percent moisture was formed on the dryer. The flake was removed from the dryer and then calcined in a box furnace under a nitrogen atmosphere at 800° C. The composition of the calcined flake was approximately 66.3 percent B₂B₃ and 30.3 percent C. The calcined flake was ground to −10 mesh.

B₄C Powder Product

Using an argon purged induction furnace, a 2 inch diameter by 4 inch high graphite crucible was heated to 1700° C. A calibrated screw feeder discharged the particulated feed at a rate of 0.75 g/min into a cooled tube positioned above the open crucible. After feeding for 10 minutes, the feeder was shut off while the temperature was maintained for several minutes to complete the reaction, then the power was shut off. The crucible cooled to room temperature and was removed from the furnace. The product was exclusively submicron and greater than 97 percent B₄C.

EXAMPLE 3

Boron Carbide Precursor

A mixture of 60 g of boric acid and 20 g of Vulcan XC-72 carbon black was added to 250 ml volume of water while heating and stirring the water to its boiling point to ensure solution of the boric acid. The solution was further heated and the water evaporated, recrystallizing the boric acid in the presence of the carbon slurry until a thick paste was obtained. The paste of boric acid, water and carbon was placed in an oven overnight at 170° C. to dry the free moisture and partially dehydrate the boric acid. The dried mass was placed on a Grafoil ® boat inside a 4 inch I.D. quartz tube which was purged with nitrogen. The tube was heated to 800° C. to convert the boron oxide hydrates-carbon mix to a B₂O₃-carbon intimate mixture. The product was cooled in nitrogen.

B₄C Powder Product

Figure 2:
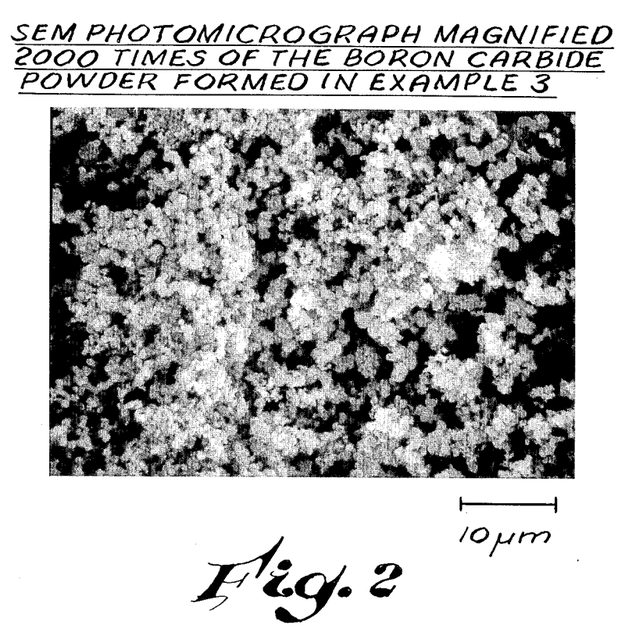
FIG. 2 is an SEM photomicrograph, magnified 2000 times, of the boron carbide powder formed in Example 3.

The B₂O₃-carbon intimate mixture was ground in a mortar to a 100 to 400 micron sized powder, about 0.5 g of the mixture was loaded in a drop charge apparatus consisting of a ½ inch stainless steel tube with a ½ inch ball valve at one end, vertically positioned above a 2¼ inch by ×4 inch high graphite crucible. The crucible was inductively heated to 1820° C. in an argon atmosphere. The bottom ball valve was opened to drop the charge into the hot crucible. The particles began reacting instantly producing enough carbon monoxide to fluidize a few red hot particles above the crucible before subsiding. After 3 minutes, the final temperature was 1780° C. The power was shut off and the system cooled in argon. The B$_4$C product was examined by SEM and the majority found to be equiaxed crystals size of 0.5 micron as shown in FIG. 2. The heating rate of the charge to the reaction temperature was about 900° C. per second.

EXAMPLE 4

Boron Carbide Precursor

A boron carbide precursor was prepared by dry mixing boric acid powder and acetylene carbon black followed by calcining the mixture in nitrogen to dehydrate and melt B$_2$O$_3$ to form an intimate mix with the carbon. Assay of the precursor showed 64.4 percent B$_2$O$_3$ and 34.7 percent C, with a 12 percent excess of B$_2$O$_3$. The mix was milled and screened to a free flowing powder which was less than 100 microns.

B$_4$C Powder Product

A vertical 4.5 inch I.D.×24 inch long graphite tube furnace was heated to 2000° C. The precursor prepared above was fed continuously into the top of the furnace with a screw feeder via a vertical ½ inch water cooled copper feed pipe which terminated 5 inches above the hot zone. The cold particulate feed along with an argon flow exited the feed tube into a reactor zone at 2000° C. which is above the minimum temperature approximately 1350° C. required for the carbon reduction of B$_2$O$_3$. This arrangement reduced the agglomeration of feed material which can occur at reactor wall temperatures higher than the melting point of B$_2$O$_3$ (300°–500° C.) and lower than the minimum reaction temperatures.

The feed particles rapidly approached the wall temperature of 2000° C. at an average heating rate of about 1000° C. to about 2000° C./second. The time of reaction was three to four seconds based on the reactor volume divided by the actual volumetric flow rate of the argon purge plus the carbon monoxide reaction gas. The reacted particles fell through a cooled section of the graphite tube and the connecting water cooled stainless steel pipe into a product collection system which was double valved to allow periodic removal of the product during continuous reaction.

The crude product of the reaction was finely divided B$_4$C surrounded and intimately mixed with submicron to micron sized excess B$_2$O$_3$.

Figure 3:
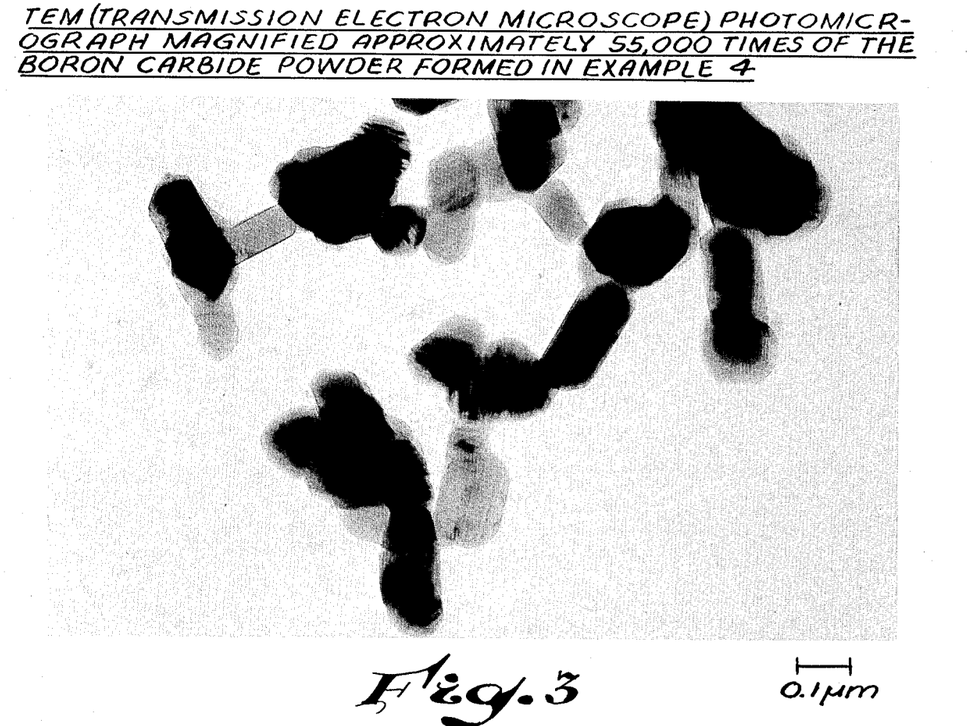
FIG. 3 is a TEM (Transmission Electron Microscope) photomicrograph, magnified 55,000 times, of the boron carbide powder formed in Example 4.

The excess B$_2$O$_3$ was separated from the B$_4$C by washing the B$_4$C with hot water whereby the B$_2$O$_3$ form soluble boric acid. The washed and dried B$_4$C product assayed 76.5 percent boron, 20.9 percent carbon. The electromicrograph of the boron carbide powder prepared in Example above is shown in FIG. 3. FIG. 3 shows exclusively submicron particles, most being 0.1 to 0.2 micron.

EXAMPLE 5

Boron Carbide Precursor

An intimate mix of active carbon and B$_2$O$_3$ was prepared by mixing a 20 percent boric acid solution containing a weight ratio of 57.1 parts H$_3$BO$_3$ to 42.9 parts of corn starch, heating to 90° C.; pumping the viscous mix onto pans in a tray drier operating at 120° C. to make a boric acid-starch flake and calcining the flake up to 800° C. in nitrogen to form B$_2$O$_3$-carbon intimate mixture.

B$_4$C Powder Product

The cooled mixture was crushed and ground to −12 mesh for feeding via a screw feeder into a crucible maintained at 1580° C.±40° C. The feed rate was 0.3 g/min.

The apparatus used was identical to the drop tube arrangement except for the screw feeder connection at the top of the tube.

The feed particles could be observed with an optical pyrometer falling from the tube hitting the bottom of the 1580° C. crucible and heating to the background temperature in 2 to 10 seconds. As the reaction continued, cold feed particles were landing on previously reacted feed with the heat up time averaging 2 seconds. The feed was shut off and 3 minutes later the atmosphere cleared. The power was then shut off and the reaction mass cooled in argon.

Figure 4:
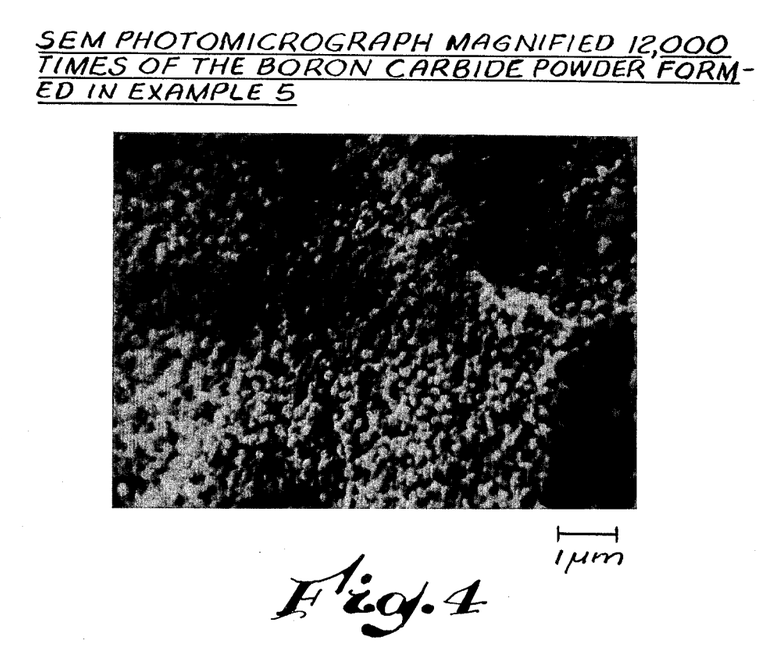
FIG. 4 is an SEM photomicrograph, magnified 12,000 times, of the boron carbide powder formed in Example 5.

A grey B$_4$C product was obtained consisting of submicron and uniform sized crystals. FIG. 4 is representative of the boron carbide powder formed in Example 5 above. The heat rate of the feed was approximately 755° C./sec.

What is claimed is:

1. A method of producing boron carbide comprising passing a particulate reactive mixture of a boric oxide source and a carbon source through a hot zone such that substantially all of the particles of the reactive mixture are separately and individually heated at a heating rate of at least about 70° C./second to a sufficient temperature and for a sufficient length of time to form boron carbide crystals of which at least about 25 percent by weight are of submicron size.

2. The method of claim 1 wherein adjacent particles of the reactive mixture are substantially simultaneously heated.

3. The method of claim 1 wherein the size of the particles of the reactive mixture ranges from about 1 micron to about 2 millimeters.

4. The method of claim 1 wherein the method is carried out continuously.

5. The method of claim 3 wherein the reactive mixture is essentially free of magnesium.

6. The method of claim 1 wherein the temperature is from about 1575° C. to about 2100° C.

7. The method of claim 6 wherein the temperature is from about 1650° C. to about 1950° C.

8. The method of claim 1 wherein the rate of heating is from about 70° C./sec to about 100,000° C./sec.

9. The method of claim 8 wherein the rate of heating is from about 200° C./sec to about 10,000° C./sec.

10. The method of claim 1 wherein the boric oxide source is boric oxide.

11. The method of claim 1 wherein the boric oxide dource is boric acid.

12. The method of claim 1 wherein the carbon source is a carbon formed from the thermal decomposition of a hydrocarbon.

13. The method of claim 1 wherein the carbon source is selected from the group consisting of carbohydrates, methyl cellulose and sugars.

14. The method of claim 1 wherein the carbon source is carbon black.

15. The method of claim 1 wherein the carbon source is acetylene carbon black.

16. The method of claim 1 wherein the carbon source is vinylidene chloride polymer.

17. The method of claim 1 wherein the carbon source is starch.

18. The method of claim 1 wherein all of the boron carbide crystals are submicron in size.

19. The method of claim 1 wherein the size of the boron carbide crystals are from about 0.05 to about 0.45 micron.

20. The method of claim 1 wherein the boron carbide powder particles are monodispersed, non-agglomerated and equiaxed particles.

21. A process for producing boron carbide comprising heating, at a rate of at least about 70° C./second, a particulate reactive mixture of a boric oxide source and a carbon source, which mixture is essentially free of magnesium, under reaction conditions such that there is formed a product which, before size classification, contains boron carbide crystals of which at least about 25 percent by weight are of submicron size.

22. The process of claim 21 wherein at least about 50 percent by weight of the crystals are of submicron size.

23. The process of claim 21 wherein at least about 65 percent by weight of the crystals are of submicron size.

24. The process of claim 21 wherein at least about 80 percent by weight of the crystals are of submicron size.

25. The process of claim 21 wherein at least about 90 percent by weight of the crystals are of submicron size.

26. The process of claim 21 wherein at least about 95 percent by weight of the crystals are of submicron size.

27. The process of claim 21 wherein at least about 95 percent by count of the boron carbide crystals are of submicron size.

28. A process for producing boron carbide, the process comprising passing a particulate reactive mixture of a boric oxide source and a carbon source through a hot zone such that substantially all of the particles of the reactive mixture are separately and individually heated at a rate of at least about 70° C./second to a sufficient temperature and for a sufficient length of time to form carbide crystals, substantially all of which are from about 0.05 to about 0.45 microns in size.

29. A process for producing boron carbide, the process comprising passing a particulate reactive mixture of a broic oxide source and a carbon source, which mixture is substantially free of magnesium, through a hot zone such that substantially all of the particles of the reactive mixture are separately and individually heated, at a heating rate of at least about 70° C. per second, at a sufficient temperature and for a sufficient length of time to form boron carbide crystals, at least 95 weight percent of which are of submicron size.

30. In a carbothermic reduction process for the preparation of boron carbide wherein a reactive mixture comprising a carbon source, and a boric oxide source, is heated in an inert atmosphere to a sufficiently high temperature to cause reduction of the boric oxide source and concomitant formation of boron carbide, the improvement which comprises heating particles of the reactive mixture separately and individually at a heating rate of from about 200° C./second to about 10,000° C./second such that at least about 80 percent by weight of the particles are of submicron size.

* * * * *

UNITED STATES PATENT AND TRADEMARK OFFICE
CERTIFICATE OF CORRECTION

PATENT NO.  : 4,804,525
DATED       : February 14, 1989
INVENTOR(S) : William Rafaniello and William G. Moore It is certified that error appears in the above-identified patent and that said Letters Patent is hereby corrected as shown below:

Column 1, line 14 please delete "application" and insert -- applications --.

Column 2, line 11 please delete "wherei" and insert -- wherein --.

Column 3, line 22 please delete "materials" and insert -- materials be substantially free of magnesium. The reaction --.

Column 3, line 59 please delete "precent" and insert -- percent --.

Column 4, line 25 please delete "cyrstals" and insert -- crystals --.

Column 5, line 41 please delete "microns" and insert -- micron --.

Column 5, line 44 please delete "For" and insert -- For example, a helical screw feeder can be observed to --.

Column 5, line 51 please delete "cyrstals" and insert -- crystals --.

Column 7, line 37 please delete "aggomerates" and insert -- agglomerates --.

UNITED STATES PATENT AND TRADEMARK OFFICE
CERTIFICATE OF CORRECTION

Page 2 of 2

PATENT NO. : 4,804,525

DATED : Feb. 14, 1989

INVENTOR(S) : William Rafaniello and William G. Moore

It is certified that error appears in the above-identified patent and that said Letters Patent is hereby corrected as shown below:

Column 8, TABLE I-continued please delete "5-10    52" and insert
-- 5-10    52
   1-5     36 --.

Column 8, line 28 please delete "$B_2B_3$" and insert -- $B_2O_3$ --.

Column 10, line 60 please delete "dource" and insert -- source --.

Column 12, line 15 please delete "broic" and insert -- boric --.

Signed and Sealed this

Seventh Day of May, 1991

Attest:

HARRY F. MANBECK, JR.

*Attesting Officer*           *Commissioner of Patents and Trademarks*